Patented Aug. 27, 1946

2,406,472

UNITED STATES PATENT OFFICE 2,406,472

MANUFACTURE OF CADMIUM YELLOW PIGMENTS

Ludwig Francis Nerlinger, Wilmington, Del., assignor to E. I. du Pont de Nemours & Company, Wilmington, Del., a corporation of Delaware No Drawing. Application November 23, 1944, Serial No. 564,899

5 Claims. (Cl. 106—301)

This invention relates to the production of cadmium yellow pigments, and more particularly to a novel improved method for obtaining zinc-containing cadmium sulfide pigments in lighter, greener shades.

Cadmium sulfide pigments are well-known, being useful primarily because of their light and heat resistance and non-bleeding characteristics. Due to their brightness, color and resistance to alkali (especially the latter) they are valuable pigments for use in aqueous emulsion type paints which have recently gained considerable commercial importance. These paints usually contain casein as a binder which is solubilized with the alkali. The water phase of the paint is therefore alkaline and the pigment which is used must be alkali-resistant. Chrome yellow has been widely used for the production of bright yellow paints but is definitely deficient in alkali resistance. Hence, it is not suitable for use in aqueous emulsion paints. Hansa Yellow pigments are not satisfactory for use in such paints, due to the tendency of the pigment to migrate to the oil phase of the paint.

Cadmium sulfide pigments range in color from orange to a greenish yellow. Their color depends, among other things, on the method of combining the reactants used in their production, the calcination temperature to which the pigment is subjected, and the amount of zinc co-precipitated with the pigment. The orange shades can be prepared by co-precipitating cadmium sulfide and barium sulfate from solutions of cadmium sulfate and barium sulfide. Some variations in hue can be obtained by proper selection of operating conditions, but no known method has existed for obtaining the lighter and greener shades of cadmium sulfide from pure cadmium sulfate solutions. Prior methods for obtaining such lighter, greener shades involve the co-precipitation of zinc and cadmium sulfides from a mixed sulfate solution.

It is among the objects of this invention to produce an improved cadmium sulfide-containing pigment, especially a zinc-containing cadmium sulfide pigment of the desired lighter, greener shades. A particular object of the invention is to provide a novel method for obtaining such improved form of insoluble cadmium yellow pigment. An additional object is to provide a cadmium yellow pigment of improved brightness of tint and which possesses excellent alkali resistance to render it advantageously useful in the manufacture of flat, aqueous, emulsion-type paints. A further object is to provide a novel method for precipitating and recovering an improved cadmium sulfide pigment. Additional objects of the invention will be apparent from the ensuing description of the invention.

The foregoing and other objects are obtainable in this invention which comprises first preparing a suspension of precipitated zinc sulfide and barium sulfate and thereafter precipitating cadmium sulfide and barium sulfate in the presence of and upon the surface of said suspended zinc sulfide particles.

In practically adapting the invention, the precipitation reaction is conveniently conducted in a suitable reaction vessel, such as a conventional type tank, equipped with a sweep agitator and to which the reactants, in solution, may be added as desired. To insure proper agitation at the start of the action, water is first added to the tank. Thereafter, a solution of zinc sulfate (at a concentration ranging from about 50-450 g./l.) together with a chemically-equivalent amount of barium sulfide, is added to the tank and until a slight reaction for sulfide ions is obtained. Addition of the chemically-equivalent amounts of these two reactants provides an aqueous suspension of raw lithopone pigment (a co-precipitated mixture of zinc sulfide and barium sulfate). After the adjustment of the end point to provide a slight test for sulfide ions, a solution of cadmium sulfate and a further quantity of barium sulfide are simultaneously added to the tank in order to precipitate a cadmium lithopone composition upon the zinc sulfide lithopone already present in the tank. The cadmium and barium reactants are added in equivalent amounts and while the pH of the solution is maintained within a range of about 6.0 to 8.5 or approaching neutrality. The resulting precipitate, comprising cadmium sulfide, zinc sulfide and barium sulfate, is then adjusted to about 8.6 pH using barium sulfide solution, is then filtered, dried and calcined at a temperature ranging from about 600–750° C. to develop essential pigment properties, including oil absorption, tinting strength, brilliance of color, etc.

To a more complete understanding of the invention, the following specific examples are given, each of which is merely illustrative of and not to be construed as limiting the invention:

Example I 200 volumes of water and 60 volumes of a zinc sulphate solution analyzing 400 grams of zinc sulphate per liter were placed in an agitated tank and to this was added sufficient 20° Baumé barium sulphide solution to give a slight excess of sulphide ions. To the resultant slurry a cadmium sulphate solution analyzing 97 grams cadmium per liter was added in a small stream while simultaneouly adding an equivalent amount of barium sulphide as a 20° Bé. solution. This simultaneous addition was continued until 750 volumes of cadmium sulphate solution were added and while maintaining the pH at approximately 7.0. At the end of the addition of these reagents, the end point was adjusted to 8.6 pH and the suspension filtered, dried and calcined at a temperature of 700° C. with the usual precautions to prevent oxidation during calcination.

The resulting pigment was compared with a pigment produced by the same amount of the reagents but by adding the zinc sulphate solution to the cadmium sulphate solution prior to precipitation. The first sample returned the same hue as the second sample, but exhibited definitely superior brilliance of color, having a brightness value (in % reflectance) of 73.5, as compared with a value of 71.9 for a product obtained in accordance with the prior art.

*Example II*

400 volumes of water and 55 volumes of a zinc sulfate solution analyzing 400 grams of $ZnO_4$ per liter were placed in an agitated tank and sufficient 20° Baumé barium sulphide solution was run in to give a slight excess of sulphide ions. To the resultant slurry 750 volumes of a cadmium sulphate solution containing 97 grams cadmium per liter was added in a small stream while simultaneously adding an equivalent amount of barium sulphide solution to maintain the pH at approximately 7.0. At the end of the addition of these reagents the end point was adjusted to 8.6 pH and the suspension filtered. The precipitate was then dried and calcined at a temperature of 700° C.

A similar pigment was prepared by adding the zinc sulfate solution to the cadmium sulfate solution prior to precipitation, using the same amount of the reagents. Because of the smaller ratio of zinc to cadmium, these pigments were slightly less green than the pigments of Example I. However, the sample prepared according to this invention was again found to exhibit definitely superior brilliance of color, giving a brightness value of 69.3 as contrasted with a value of 64.8 for the prior art product.

The order of addition of the various reagents in the invention has been found to be quite important in and critical to the production of brilliant and uniform colors in accordance with the invention. As outlined above, the zinc sulfide is first precipitated and suspended in aqueous slurry, following which precipitation of the cadmium sulfide is effected. This order of precipitation is essential and critical to the invention and has been found necessary in obtaining the marked improvements which the present invention affords, especially over the prior art method of co-precipitation, wherein the zinc and cadmium sulfate solutions have been combined before the precipitation takes place. Therefore, it will be understood that the improved method of this invention comprises the precipitation of cadmium lithopone in the presence of zinc lithopone by use of the simultaneous addition of the cadmium sulfate and barium sulfide reactants to a zinc lithopone slurry. While it is not fully understood why the unexpected results accrue by reason of the procedures resorted to herein, the quality of the resulting product demonstrates the existence of a clear advance in the art, the resulting pigment being eminently suited for use in aqueous emulsion paints wherein alkali resistance and brilliance of color are of prime importance.

While a zinc sulfide or zinc sulfide-containing precipitate comprises a preferred type of material upon which the cadmium sulfide is precipitated, other insoluble zinc compounds, such as the oxide, carbonate, silicate, or phosphate, may be suspended in aqueous media for intimate association with the cadmium sulfide subsequently precipitated in said suspension. These zinc materials need not be prepared in the reaction tank used for the precipitation of the cadmium lithopone, but may be precipitated in a separate vessel if it is found more convenient to do so. Thus, in the case of the use of zinc lithopone as a starting material, raw zinc lithopone liquor from normal zinc lithopone operations may be conveniently used. In the practice of the invention, however, it is necessary and essential that the insoluble zinc compound be present at the start of the reaction, in order that the cadmium lithopone can be effectively precipitated upon and intimately associated therewith. Mere addition of the insoluble zinc compound to a suspension of precipitated cadmium lithopone, followed by filtration, drying and calcination, will not yield the superior product obtained by a practice of this invention, nor will the co-precipitation of the zinc sulfide with the cadmium, as contemplated in prior practice, yield a pigment exhibiting superior brilliance of color possessed by the product of this invention.

The brightness values referred to herein were determined by well-known tests involving the preparation of a paste of the pigment in oil and examining a film, using a Hunter reflectometer and with a green light filter.

I claim as my invention:

1. A process for producing an improved cadmium sulfide pigment which comprises precipitating cadmium sulfide by reacting sulfate with barium sulfide in the presence of an aqueous slurry suspension of raw lithopone pigment consisting of a co-precipitated mixture of zinc sulfide and barium sulfate, and then recovering and calcining the resulting zinc-containing cadmium sulfide product at a temperature ranging from 600–750° C.

2. A process for producing an improved cadmium sulfide pigment which comprises precipitating cadmium lithopone in the presence of zinc lithopone by simultaneously adding to a suspended aqueous slurry of said zinc lithopone solutions of cadmium sulfate and barium sulfide, and then recovering and calcining the resulting cadmium lithopone pigment.

3. A process for obtaining an improved cadmium sulfide pigment which comprises initially suspending raw lithopone pigment consisting of a co-precipitated mixture of zinc sulfide and barium sulfate, in an aqueous slurry, and thereafter simultaneously adding to the resulting suspension solutions of cadmium sulfate and barium sulfide, in order to precipitate cadmium lithopone upon said suspended raw lithopone, and then recovering and calcining the resulting zinc-containing cadmium sulfide product.

4. A process for obtaining an improved cadmium sulfide pigment which comprises reacting cadmium sulfate with barium sulfide in an aqueous slurry suspension of an insoluble inorganic zinc compound to precipitate cadmium sulfide upon said suspended zinc compound, and then recovering and calcining the resulting zinc-containing cadmium sulfide product.

5. A process for obtaining an improved cadmium sulfide pigment which comprises reacting cadmium sulfate with barium sulfide in an aqueous slurry suspension of zinc sulfide to precipitate cadmium sulfide upon said suspended zinc sulfide, and then recovering and calcining the resulting zinc-containing cadmium sulfide product.

LUDWIG FRANCIS NERLINGER.

Certificate of Correction

Patent No. 2,406,472. August 27, 1946.

LUDWIG FRANCIS NERLINGER

It is hereby certified that errors appear in the printed specification of the above numbered patent requiring correction as follows: Column 2, line 18, for "action" read *reaction*; column 3, line 28, for "$ZnO_4$" read *$ZnSO_4$*; column 4, line 45, claim 1, before "sulfate" insert *cadmium*; and line 63, claim 3, for "consisiting" read *consisting*; and that the said Letters Patent should be read with these corrections therein that the same may conform to the record of the case in the Patent Office.

Signed and sealed this 29th day of October, A. D. 1946.

[SEAL]

LESLIE FRAZER,
*First Assistant Commissioner of Patents.*